United States Patent Office 3,374,198

Patented Mar. 19, 1968

3,374,198

VULCANIZABLE COMPOSITIONS OF OLEFIN COPOLYMERS

Luigi Falcone, Como, and Bruno Galletti, Ferrara, Italy, assignors to Montecatini Edison, S.p.A., Milan, Italy No Drawing. Filed Nov. 20, 1964, Ser. No. 412,841
Claims priority, application Italy, Nov. 21, 1963, 23,690/63
10 Claims. (Cl. 260—41)

ABSTRACT OF THE DISCLOSURE

Compounding of ethylene-propylene and ethylene-butene-1 copolymers with specified inorganic fillers and with substance which promotes dispersion of filler and which results in improved mechanical properties of the vulcanizate. Disperson promoter may be polychloroprene, rubbery butadiene-acrylonitrile copolymers, ethylene-vinyl acetate copolymers, butadiene-styrene-methyl vinyl pyridine terpolymers, chlorosulphonated ethylene-propylene copolymers, brominated butyl rubber, polycondensation products of sodium polysulphide with a dihaloalkane, and products obtained by grafting maleic acid or maleic anhydride onto an olefinic polymer or copolymer.

This invention is directed to a process for the preparation of vulcanizates having good mechanical properties. More specifically, the vulcanizates are prepared from a mitxure comprising an amorphous, saturated copolymer of ethylene and a higher alphaolefin in combination with vulcanizing agents, a mineral reinforcing filler, and a dispersing agent for promoting the dispersion of the filler. Still more specifically, this invention is directed to various articles prepared from the above-mentioned vulcanizable compositions which have improved mechanical characteristics.

The use of amorphous, saturated copolymers of ethylene and alphaolefins, particularly the copolymers of ethylene and propylene as synthetic rubbers, is well known in the art. It is further known that these synthetic copolymers are characterized by having an excellent resistance to oxidation, heat, ageing, and to chemical reagents. Because of their saturated character, however, these particular copolymers require strong vulcanizing agents for their vulcanization. These vulcanizing agents include such compounds as the organic peroxides, generally combined with coagents such as sulphur, quinone compounds, furfural-derivatives, etc. These coagents help to reduce the secondary reactions and increase the degree of cross-linking in the copolymer.

The elastomers obtained from these vulcanizates, however, have rather unsatisfactory mechanical characteristics if they do not contain reinforcing fillers. Therefore, before the elastomers can be used it is necessary to incorporate therein various reinforcing fillers such as carbon black, or various other mineral fillers such as clay, silica, calcium carbonate, etc. These latter fillers, which are normally white in color, are indispensable in the manufacturing of articles which require a light color and high electrical properties. In contrast to carbon black, the mineral fillers are more difficult to disperse in the copolymers and, therefore, it is necessary to use a dispersing agent or promoter.

Previously applicants have described the use of maleic acid or maleic anhydride and various derivatives thereof as a means of dispersing the various mineral fillers in the copolymer. In addition, the micro- and macro-molecular derivatives of maleic acid including the imides, the condensation products of maleic anhydride and a diepoxide, and copolymers of maleic acid have been disclosed as being useful as a dispersing agent for the mineral fillers. More particularly, applicants have disclosed that these dispersing agents combined with a thermo-mechanical pretreatment of the composition in a mixer at 200–250° C., in the absence of the vulcanizing agents, could be used as a means of dispersing the inorganic mineral fillers throughout the copolymer. Although these dispersing agents have given satisfactory results, it is still very important and highly desirable to find other materials which are more particularly suited as dispersion promoters for the inorganic fillers.

Accordingly, it is an object of this invention to provide a process for the preparation of vulcanizates which have improved mechanical characteristics obtained by using a particular dispersion promoter as the dispersant for the white mineral filler. Moreover, it is an object of this invention to provide a dispersion promoter which presents advantages over the dispersants used heretofore.

These and other objects can be obtained by using a dispersing agent which promotes dispersion of the mineral fillers. These promoters comprise a macromolecular elastomeric compound containing polar groups in the macromolecule. More specifically, it has been discovered, quite unexpectedly, that excellent dispersion of the filler can be obtained in the amorphous, saturated copolymers of ethylene and other alphaolefins by using an effective amount of a dispersion promoter. These promoters can be characterized as macromolecular elastomeric compounds containing polar groups. It is preferred, however, to use the dispersion promoter in combination with a pretreatment of the composition. In other words, the copolymer in combination with the filler and dispersant are pretreated in a mixer at a temperature ranging from about 200–250° C. It is important, however, to withhold the addition of the vulcanizing agents to the composition during the pretreatment at these temperatures.

The use of polar elastomeric compositions as dispersion promoters has various advantages in that they include the "special rubbers" which are readily available in commerce at reasonable cost and are generally compatible with the olefinic copolymers at least within the limits of their addition hereinafter indicated. These dispersion promoters furthermore will covulcanize with the olefinic copolymers with the aid of the peroxides. These maleic acid promoters have the further advantage of being neither volatile nor toxic and are non-corrosive with respect to the machinery or molds. The elastomers having polar characteristics and most effective as dispersion promoters comprise the monomeric olefin polymers and copolymers containing polar substituents such as the halogens, nitriles, pyridines, esters, etc. In addition, the dispersion promoters include products obtained by chemically treating olefinic polymers and copolymers such as halogenating, chlorosulphonating and grafting of maleic acid or maleic anhydride onto the polymer. Further these promoters can be prepared by the polycondensation of sodium polysulphide and a dihalogenated aliphatic hydrocarbon, e.g. thioplastics.

The dispersion promoters used for purposes of this invention include the polar rubbers such as polychloroprene, i.e. neoprene, nitrile rubbers, i.e., Buna N or Elaprim, the ethylene-vinylacetate copolymers, i.e. Levapren or Elvax, and the butadiene-styrene-methylvinylpyridine terpolymers, i.e. Gentac. A second class of polar rubbers includes chlorosulphonated ethylene-propylene copolymers and brominated butyl rubber, i.e. Hycar. The third class of polar rubbers include the polysulphide rubbers, i.e. Thiokol.

The saturated amorphous and elastomeric copolymers of ethylene and the alphaolefins particularly including the copolymers of ethylene and propylene or butene-1 which may be used for the purposes of this invention are obtained by processes well known in the art. More particularly, these copolymers are obtained by copolymerizing the monomers in the presence or absence of a solvent with the aid of a catalytic system consisting essentially of the reaction product of a hydrocarbon-soluble transition metal compound and an alkyl metal compound wherein the metal is selected from the 1st, 2nd or 3rd Groups of the Periodic Table. More particularly, these elastomeric copolymers are obtained with catalytic systems consisting of the reaction products of $VCl_4$, $VOCl_3$ or vanadium acetylacetonate with aluminum trialkyls or aluminum alkylhalides at temperatures of from −100 to +100° C. These copolymers are prepared with the ethylene content ranging from about 20–80% by mols with the molecular weights ranging from about 50,000 to 500,000. In some cases, these copolymers can be extended with paraffinic oils in order to improve their workability.

The white mineral fillers used as the reinforcing fillers are those well-known in the art for use with natural and synthetic rubbers and include such materials as silica, silicates, kaolin, talc, clay, calcium carbonate, alumina, etc.

The amount of filler to be added to the copolymers varies from about 10 to 400% and preferably from about 50 to 150% based on the weight of the polymer. In those cases where the polymeric composition contains a mineral filler which is acid in nature and an organic peroxide which is sensitive to the acid filler, then it may be necessary to add a basic constituent such as diphenyl-guanidine, or other known materials to offset the acidity.

The amount of polar rubber to be added in accordance with this invention depends on the characteristics desired in the final product, on the type and on the amount of filler to be used. Generally, the polar rubber is added in an amount ranging from about 1–20% by weight of the polymer and, for normal levels of reinforcing characteristics, in an amount, of about 5% by weight of the polymer.

The addition of the polar rubber to the polymeric composition can be accomplished without any difficulty in a conventional apparatus normally used for the working of rubber. It is preferred to add the polar rubber to the copolymer and the mineral filler in a Banbury mixer at temperatures of 200–250° C. in the absence of the vulcanizing agent. After the thermo-mechanical treatment, the mix is cooled and the vulcanizing agents e.g. sulfur and an organic peroxide are added in a roll mixer. The peroxide is added in an amount ranging from about 0.1–10 parts by weight per 100 parts by weight of the copolymer, with the sulfur being added in an amount less than ½ of the amount by weight of the peroxide used. Vulcanization of the entire polymeric composition is then carried out at a temperature ranging from about 110–210° C. and preferably between 140° and 180°.

The thermo-mechanical pretreatment at 200–250° C. has a particularly favorable effect in the final characteristic of the vulcanizate. However, the above-mentioned polar rubber may be used effectively without the therm-mechanical pretreatment. It was noticed, however, that without the pretreatment, the mechanical characteristics were not improved to the same degree as those compositions which received the pretreatment.

Additional ingredients may be added to the composition and include such materials as zinc oxide, and glycols such as glycerine. Glycols have been used previously in butyl rubbers and are known to act as a moistening agent which protects the white filler. Moreover, the glycols have been found to further improve the mechanical reinforcement of the vulcanizate.

With respect to the mechanical characteristics, the two most important parameters of the vulcanizates are the elastic modulus at 300% and the permanent set after 200% elongation for 1 hour. These parameters are particularly important when considering the use of the vulcanizates in preparing colored articles, tire walls, extrudates such as gaskets for car accessories, and electrical insulating products, etc.

The following examples are given merely as illustrations of the process and the products prepared therefrom in accordance with this invention.

In accordance with this invention, in order to show the effectiveness of the promoters with and without the thermo-pretreatment, the following compositions were prepared cold and hot by the following technique. In the cold technique, the composition was prepared by mixing all of the ingredients, in sequence, in a roll mixer where they were worked in the following order of addition and for the periods of times indicated below:

| Components added: | Time (minutes) |
|---|---|
| Copolymer | 0 |
| Half of the mineral filler | 3 |
| The other half of the filler+promoter (occasionally ZnO, glycerine and a basic corrective agent if needed) | 10 |
| Vulcanizing agents (sulphur+an organic peroxide) | 15 |
| Discharging of the mixture | 20 |

In the hot technique, the composition was prepared in a Banbury type mixer wherein the following ingredients were added in accordance with the time and order given below:

| Components added: | Time (minutes) |
|---|---|
| Copolymer | 0 |
| Half of the mineral filler | 2 |
| Other half of the filler+promoter (occasionally ZnO, glycerine and a basic corrective agent if needed) | 6 |

After a total of about 11 minutes, the temperature was raised to about 200° C. and the mix was worked in an inner mixer for 15 additional minutes. The composition was then discharged and placed into a mixer having cooled rolls wherein the vulcanizing agent including sulphur and an organic peroxide were added.

*Example 1*

This example illustrates the activity of a commercially-available copolymer of ethylene-vinylacetate known as Bayer's Levapren 450. This copolymer was used to disperse two different types of fillers with and without a thermo-mechanical pretreatment of the compositions as shown in Table 1.

TABLE 1

| | Composition I | Composition II |
|---|---|---|
| Composition of the Mix, Parts by Weight: | | |
| Ethylene-propylene copolymer (having an ethylene content of 50% by mol and a Mooney ML (1+4) viscosity at 100° C. of 47) | 100 | 100 |
| Calcined kaolin (Whitetex) | 100 | |
| Silicic acid (Hi-Sil 233) | | 50 |
| Levapren 450 (copolymer of ethylene-vinyl acetate) | 5 | 5 |
| ZnO | 2 | 2 |
| Glycerine | | 3 |
| Sulphur | 0.4 | 0.4 |
| Tetrachlorinated tert.butyl peroxide | .34 | 3.4 |

TABLE 1.—Continued

| Vulcanization conditions in press | 50 min./165° C. | | 50 min./165° C. | |
|---|---|---|---|---|
| Thermal treatment [1] | Treated | Not Treated | Treated | Not Treated |
| Mechanical Characteristics: | | | | |
| Tensile strength, kg./cm.$^2$ | 70 | 57 | 135 | 130 |
| Elongation at break, percent | 450 | 400 | 450 | 505 |
| Elastic modulus at 300%, kg./cm.$^2$ | 60 | 52 | 80 | 50 |
| Permanent set, percent | 9 | 9 | 8.5 | 10.5 |
| Tear strength, kg./cm.$^2$ | 35 | 32 | 50 | 44 |
| ISO hardness | 60 | 60 | 64 | 64 |

[1] At 200° C. in a Banbury Type GK2 mixer for 15 minutes.

*Example 2*

This example illustrates the effect of the addition of a dispersion promoter comprising a 1:1 copolymer of ethylene-vinylacetate known commercially as Du Pont de Nemours' Elvax. The promoter was added to the compositions which were in some cases subjected to a thermo-mechanical pretreatment at 200° C. as shown in Table 2.

TABLE 2

| | Without thermal pretreatment | | With thermal pretreatment | |
|---|---|---|---|---|
| | Without Elvax | With Elvax | Without Elvax | With Elvax |
| Composition of the Mix: | | | | |
| Ethylene-propylene copolymer (the same as in Table 1) | 100 | 100 | 100 | 100 |
| Calcined Kaolin (Whitetex) | 100 | 100 | 100 | 100 |
| Elvax | | 10 | | 10 |
| Zinc Oxide | 2 | 2 | 2 | 2 |
| Sulphur | 0.4 | 0.4 | 0.4 | 0.4 |
| Tetrachlorinated t.butyl peroxide | 3.4 | 3.4 | 3.4 | 3.4 |
| | Vulcanization conditions in press: 50 min./165° C. | | | |
| Mechanical Characteristics: | | | | |
| Tensile strength, kg./cm.$^2$ | 45 | 45 | 50 | 65 |
| Elongation at break, percent | 600 | 400 | 450 | 450 |
| Elastic modulus at 300%, kg./cm.$^2$ | 30 | 40 | 40 | 55 |
| Permanent set, percent | 12.5 | 10 | 11.5 | 10.5 |
| Tear strength, kg./cm.$^2$ | 30 | 30 | 36 | 35 |

*Example 3*

This example shows the improvement obtained with respect to mechanical characteristics when employing a copolymer of ethylene-vinyl-acetate, i.e. Levapren and Elvax. Here the copolymeric compositions were not pretreated as in the previous examples and consisted essentially of the following composition.

| Composition of the mix: | Parts by weight |
|---|---|
| Ethylene-propylene copolymer (same as in Table 1) | 100 |
| Mineral filler | As shown in Table 3 |
| Promoter | As shown in Table 3 |
| Zinx oxide | 2 |
| Sulphur | 0.4 |
| Tetra-chlorinated t.-butyl peroxide | 3.5 |
| Vulcanization conditions ---min./165° C. | 50 |

TABLE 3

| Mineral Filler | Parts by Weight | Promoter | Parts by Weight | Glycerine, Parts by Weight | Tensile strength, kg./cm.$^2$ | Elongation at break, percent |
|---|---|---|---|---|---|---|
| Calcined kaolin (Whitetex) | 100 | | | | 40 | 600 |
| | | Levapren | 5 | | 55 | 400 |
| | | Elvax | 10 | | 46 | 400 |
| Blown kaolin (Windsor C clay), (hard) | 100 | | | | 85 | 720 |
| | | Levapren | 5 | | 80 | 645 |
| | | Elvax | 10 | | 95 | 680 |
| Blown kaolin (Nord-Hoff) | 100 | | | | 42 | 770 |
| | | Levapren | 5 | | 36 | 400 |
| Calcium carbonate (Socal U 1), (fine) | 100 | | | | 60 | 630 |
| | | Elvax | 10 | | 68 | 650 |
| Magnesium silicate (talc) | 100 | | | | 33 | 520 |
| | | Levapren | 5 | | 33 | 450 |
| | | Elvax | 10 | | 37 | 530 |
| Silicic acid (Hi-Sil) hydrate | 50 | | | 3 | 135 | 650 |
| | | Levapren | 5 | | 125 | 530 |
| | | Levapren | 5 | 3 | 135 | 600 |
| | | Elvax | 10 | | 145 | 620 |
| Anhydrous silicic acid (Aerosil) | 30 | | | 4 | 160 | 700 |
| | | Levapren | 5 | | 115 | 570 |
| | | Levapren | 5 | 4 | 155 | 700 |
| | | Elvax | 10 | | 135 | 620 |

TABLE 3.—Continued

| Mineral Filler | Parts by Weight | Promoter | Parts by Weight | Glycerine, Parts by Weight | Modulus at 300%, kg./cm.[2] | Permanent set, kg./cm.[2] Percent |
|---|---|---|---|---|---|---|
| Calcined kaolin (Whitetex) | 100 | | | | 30 | 11 |
| | | Levapren | 5 | | 52 | 8.5 |
| | | Elvax | 10 | | 40 | 10 |
| Blown kaolin (Windsor C clay), (hard) | 100 | | | | 25 | 23 |
| | | Levapren | 5 | | 40 | 14 |
| | | Elvax | 10 | | 40 | 20 |
| Blown kaolin (Nord-Hoff) | 100 | | | | 21 | 18 |
| | | Levapren | 5 | | 33 | 11 |
| Calcium carbonate (Socal U 1), (fine) | 100 | | | | 16 | 12.5 |
| | | Elvax | 10 | | 25 | 11 |
| Magnesium silicate (talc) | 100 | | | | 22 | 18 |
| | | Levapren | 5 | | 30 | 14 |
| | | Elvax | 10 | | 27 | 15 |
| Silicic acid (Hi-Sil) hydrate | 50 | | | 3 | 33 | 18 |
| | | Levapren | 5 | | 50 | 10.5 |
| | | Levapren | 5 | 3 | 40 | 11.5 |
| | | Elvax | 10 | | 45 | 13 |
| Anhydrous silicic acid (Aerosil) | 30 | | | 4 | 20 | 16 |
| | | Levapren | 5 | | 35 | 10 |
| | | Levapren | 5 | 4 | 25 | 11 |
| | | Elvax | 10 | | 30 | 10.5 |

| Mineral Filler | Parts by Weight | Promoter | Parts by Weight | Glycerine, Parts by Weight | Tear Strength, kg./cm.[2] |
|---|---|---|---|---|---|
| Calcined kaolin (Whitetex) | 100 | | | | 28 |
| | | Levapren | 5 | | 32 |
| | | Elvax | 10 | | 30 |
| Blown kaolin (Windsor C clay), (hard) | 100 | | | | 30 |
| | | Levapren | 5 | | 36 |
| | | Elvax | 10 | | 38 |
| Blown kaolin (Nord-Hoff) | 100 | | | | 25 |
| | | Levapren | 5 | | 28 |
| Calcium carbonate (Socal U 1), (fine) | 100 | | | | 18 |
| | | Elvax | 10 | | 24 |
| Magnesium silicate (talc) | 100 | | | | 22 |
| | | Levapren | 5 | | 24 |
| | | Elvax | 10 | | 26 |
| Silicic acid (Hi-Sil) hydrate | 50 | | | 3 | 42 |
| | | Levapren | 5 | | 44 |
| | | Levapren | 5 | 3 | 41 |
| | | Elvax | 10 | | 42 |
| Anhydrous silicic acid (Aerosil) | 30 | | | 4 | 28 |
| | | Levapren | 5 | | 27 |
| | | Levapren | 4 | 4 | 30 |
| | | Elvax | 10 | | 30 |

Levapren 450—Bayer's "random" ethylene/vinylacetate copolymer.
Elvax—Du Pont's 1:1 ethylene/vinylacetate copolymer.

*Example 4*

The data in Table 4 shows the comparative characteristics of the various composition containing ground kaolin (Whitetex) as a filler with various polar rubbers as a promoter for the dispersion of the filler in the copolymer. In addition, the data in the table further indicates that some of the examples were subject to a thermal pre-treatment at 200° C. in a Banbury type mixer for about 15 minutes.

TABLE 4

| | 1 | 2 | 3 | 4 | 5 | 6 | 7 |
|---|---|---|---|---|---|---|---|
| Composition of Mix, Parts by weight: | | | | | | | |
| Ethylene-propylene copolymer (having an ethylene content by mols of 50% and a Mooney ML (1+4) viscosity at 100° C. of 47) | 100 | 100 | 100 | 100 | 100 | 100 | 100 |
| Calcined kaolin (Whitetex) | 100 | 100 | 100 | 100 | 100 | 100 | 100 |
| Grafted ethylene-propylene copolymer [1] | | 2 | | | | | |
| Nitrile rubber (Elaprim S. 351) [2] | | | 5 | | | | |
| Thiokol A | | | | 5 | | | |
| Gentac | | | | | 5 | | |
| Chlorosulphonated ethylene propylene copolymer [3] | | | | | | 5 | |
| Neoprene | | | | | | | 5 |
| ZnO | 2 | 2 | 2 | 2 | 2 | 2 | 2 |
| Sulphur | 0.4 | 0.4 | 0.4 | 0.4 | 0.4 | 0.4 | 0.4 |
| Tetrachlorinated t.-butyl peroxide | 3.5 | 3.5 | 3.5 | 3.5 | 3.5 | 3.5 | 3.5 |

Vulcanized at 165° C. for 50 minutes.

| Thermal treatment [4] | Yes | No | Yes | No | Yes | No | Yes | No | Yes | No | Yes | No | Yes | No |
|---|---|---|---|---|---|---|---|---|---|---|---|---|---|---|
| Mechanical characteristics: | | | | | | | | | | | | | | |
| Tensile strength, kg./cm.[2] | 50 | 42 | 76 | 54 | 66 | 45 | 65 | 28 | 60 | 50 | 56 | 48 | 47 | 51 |
| Elongation at break, percent | 450 | 650 | 320 | 570 | 330 | 390 | 480 | 680 | 350 | 380 | 380 | 410 | 530 | 480 |
| Elastic modulus at 300%, kg./cm.[2] | 45 | 28 | 75 | 52 | 64 | 42 | 55 | 12 | 57 | 46 | 52 | 42 | 35 | 39 |
| Permanent set, percent | 11 | 13 | 6 | 6 | 6 | 7.5 | 8 | 26 | 6 | 8 | 8 | 10.5 | 10 | 8 |
| Tear strength, kg./cm.[2] | 34 | | 38 | 28 | 36 | 23 | 43 | 18 | 30 | 24 | 31 | 25 | 24 | 24 |
| IRHD hardness | 61 | 59 | 64 | 64 | 64 | 64.5 | 61 | 58 | 64 | 66.5 | 63 | 64.5 | 64 | 65.5 |

[1] 2% of maleic acid grafted onto ethylene-propylene copolymer with the aid of 0.5% of tetrachlorinated-t.-butyl peroxide by treatment in a Banbury mixer at 200° C. for 10 minutes.
[2] Butadiene-acrylonitrile copolymer with 37–38% of acrylonitrile.
[3] Chlorosulphonated ethylene-propylene copolymer containing 2% of Cl and 1% of S.
[4] At 200° C. in a Banbury type GK–2 for 15 minutes.

*Example 5*

Similar to Example 4, the data in Table 5 compares the vulcanizates obtained from compositions containing a hydrated silica (Hi-Sil) as a reinforcing filler with various polar rubbers as the dispersion promoter. In addition some of the compositions were pretreated at 200–250° C.

TABLE 5

| | 1 | 2 | 3 | 4 |
|---|---|---|---|---|
| Composition of the Mix, Parts by Weight: | | | | |
| Ethylene-propylene copolymer (having an ethylene content by mol of 50% and a Mooney ML (1+4) viscosity at 100° C. of 47) | 100 | 100 | 100 | 100 |
| Silicic acid (Hi-Sil) | 50 | 50 | 50 | 50 |
| Grafted ethylene-propylene copolymer [1] | | 5 | | |
| Nitrile rubber (Elaprim S. 351)[2] | | | 5 | |
| Thiokol A | | | | 5 |
| Gentac | | | | |
| Chlorosulphonated ethylene-propylene copolymer [3] | | | | |
| Glycerine | | | | |
| ZnO | 2 | 2 | 2 | 2 |
| Sulphur | 0.4 | 0.4 | 0.4 | 0.4 |
| Tetrachlorinated-t.-butyl peroxide | 3.5 | 3.5 | 3.5 | 3.5 |

Vulcanized at 165° C. for 50 minutes.

| Thermal treatment [4] | Yes | No | Yes | No | Yes | No | Yes | No |
|---|---|---|---|---|---|---|---|---|
| Mechanical characteristics: | | | | | | | | |
| Tensile strength, kg./cm.[2] | 136 | 165 | 117 | 135 | 131 | 116 | 138 | 132 |
| Elongation at break, percent | 830 | 1000 | 600 | 620 | 520 | 630 | 610 | 860 |
| Elastic modulus at 300%, kg./cm.[2] | 32 | 25 | 47 | 39 | 65 | 42 | 49 | 24 |
| Permanent set, percent | 22 | 35 | 16.5 | 26 | 11 | 14.5 | 16 | 28 |
| Tear strength, kg./cm.[2] | 63 | 80 | 55 | 38 | 50 | 36 | 69 | 52 |
| IRHD hardness | | | 68.5 | 83 | 73 | 84.5 | 72 | 84 |

| | 5 | 6 | 7 | 8 |
|---|---|---|---|---|
| Composition of the Mix, Parts by Weight: | | | | |
| Ethylene-propylene copolymer (having an ethylene content by mol of 50% and a Mooney ML (1+4) viscosity at 100° C. of 47) | 100 | 100 | 100 | 100 |
| Silicic acid (Hi-Sil) | 50 | 50 | 50 | 50 |
| Grafted ethylene-propylene copolymer [1] | | | | 5 |
| Nitrile rubber (Elaprim S. 351) [2] | | | | |
| Thiokol A | | | | |
| Gentac | | | | |
| Chlorosulphonated ethylene-propylene copolymer [3] | | | | |
| Glycerine | | | 3 | 3 |
| ZnO | 2 | 2 | 2 | 2 |
| Sulphur | 0.4 | 0.4 | 0.4 | 0.4 |
| Tetrachlorinated-t.-butyl peroxide | 3.5 | 3.5 | 3.5 | 3.5 |

Vulcanized at 165° C. for 50 minutes.

| Thermal treatment [4] | Yes | No | Yes | No | Yes | No | Yes | No |
|---|---|---|---|---|---|---|---|---|
| Mechanical characteristics: | | | | | | | | |
| Tensile strength, kg./cm.[2] | 126 | 128 | 114 | 157 | 154 | 170 | 122 | 134 |
| Elongation at break, percent | 390 | 660 | 630 | 640 | 610 | 900 | 500 | 600 |
| Elastic modulus at 300%, kg./cm.[2] | 52 | 41 | 43 | 40 | 53 | 28 | 60 | 30 |
| Permanent set, percent | 96 | 15 | 20 | 26 | 16 | 20 | 10.5 | 24 |
| Tear strength, kg./cm.[2] | 54 | 42 | 58 | 41 | 63 | 70 | 37 | 28 |
| IRHD hardness | 71.5 | 84 | 71 | 84.5 | | | 69 | 79 |

| | 9 | 10 | 11 | 12 |
|---|---|---|---|---|
| Composition of the Mix; Parts by Weight: | | | | |
| Ethylene-propylene copolymer (having an ethylene content by mol of 50% and a Mooney ML(1+4) viscosity at 100° C. of 47) | 100 | 100 | 100 | 100 |
| Silicic acid (Hi-Sil) | 50 | 50 | 50 | 50 |
| Grafted ethylene-propylene copolymer [1] | | | | |
| Nitrile rubber (Elaprim S. 351) [2] | 5 | | | |
| Thiokol A | | 5 | | |
| Gentac | | | 5 | |
| Chlorosulphonated ethylenepropylene copolymer [3] | | | | 5 |
| Glycerine | 3 | 3 | 3 | 3 |
| ZnO | 2 | 2 | 2 | 2 |
| Sulphur | 0.4 | 0.4 | 0.4 | 0.4 |
| Tetrachlorinated-t.-butylperoxide | 3.5 | 3.5 | 3.5 | 3.5 |

Vulcanized at 165° C. for 50 minutes.

| Thermal treatment [4] | Yes | No | Yes | No | Yes | No | Yes | No |
|---|---|---|---|---|---|---|---|---|
| Mechanical characteristics: | | | | | | | | |
| Tensil strength, kg./cm.[2] | 130 | 132 | 140 | 148 | 135 | 139 | 123 | 116 |
| Elongation at break, percent | 450 | 1140 | 630 | 640 | 450 | 630 | 480 | 610 |
| Elastic modulus at 300%, kg./cm.[2] | 80 | 33 | 51 | 50 | 59 | 40 | 62 | 37 |
| Permanent set, percent | 10 | 16.5 | 14.5 | 10 | 12.5 | 18 | 10 | 22.5 |
| Tear strength, kg./cm.[2] | 43 | 36 | 66 | 55 | 47 | 37 | 41 | 49 |
| IRHD hardness | 72 | 81 | 70 | 68 | 72 | 82 | 69 | 80 |

[1] 2% of maleic acid grafted onto an ethylene-propylene copolymer with the aid of 0.5% of tetrachlorinated-t.-butyl peroxide in a Banbury mixer at 200° C. for 10 minutes.

[2] Butadiene-acrylonitrile copolymer with 27–38% of acrylonitrile.

[3] Chlorosulphonated ethylene-propylene copolymer containing 2% of Cl and 1% of S.

[4] At 200° C. in a Banbury type GK-2 mixer for 15 minutes.

*Example 6*

The data obtained from this example are reported in Table 6 which illustrates two vulcanizates subject to a thermo-mechanical pre-pretreatment at 200° C. in a Banbury mixer. The two different mixtures contain the promoter Levapren 450 and an acidic white filler (calcined kaolin) and silicic acid respectively. The vulcanizing agents consist of sulphur and an aromatic organic peroxide. Since the peroxide is sensitive to the presence of the acidic filler, a basic corrective compound, i.e. diphenyl guanidine was added to the mixture.

TABLE 6

| | Composition I | Composition II |
|---|---|---|
| Composition of the Mix, Parts by weight: | | |
| Ethylene-propylene copolymer (having an ethylene content of 50% by mol and a Mooney ML 1+4 viscosity at 100° C. of 47) | 100 | 100 |
| Calcined kaolin (Whitetex) | 100 | ---------- |
| Silicic acid (Hi-Sil) 233 | ---------- | 50 |
| Lavapren 450 | 5 | 5 |
| ZnO | 2 | 2 |
| Diphenylguanidine | 0.5 | 0.5 |
| Sulphur | 0.4 | 0.4 |
| Alpha, alpha'-bis (t.butylperoxy) diisopropylbenzene (Peroximon) | 2.1 | 2.1 |
| Vulcanization conditions in press, 40° C. to 165° C. | | |
| Thermal treatment at 200° C. in a Banbury GK–2 type mixer for 15 min | Treated | Treated |
| Mechanical Characteristics: | | |
| Tensile strength, kg./cm.² | 63 | 137 |
| Elongation at break, percent | 410 | 500 |
| Elastic modules at 300%, kg./cm.² | 54 | 65 |
| Permanent set, percent | 8 | 9 |
| Tear strength, kg./cm.² | 33 | 51 |
| ISO hardness | 63 | 67 |

*Example 7*

Example 7 illustrates by the data given in Table 7 the various vulcanizates preparedd without a thermo-pretreatment. The composition used in obtaining the data comprised various white fillers, e.g., Levapren 450 as the dispersion promoter with sulphur and an organic peroxide as the vulcanizing agents. In view of the acidity of the various fillers, it was again necessary to add a basic corrective compound, i.e., diphenyl guanidine to the composition so as to protect the perixode which is sensitive to acidic components. The composition used for obtaining the date in Table 7 is as follows:

| Composition of the vulcanizate: | Parts by weight |
|---|---|
| Ethylene-propylene copolymer (55 mol percent of propylene-ML(1+4) at 100° C.=50) | 100 |
| White filler | As shown in Table 7 |
| Lexapren 450 | 5 |
| Zinc oxide | 2 |
| Sulphur | 0.4 |
| Alpha, alpha' - bis(t.butylperoxy)diisopropylbenzene | 2.1 |
| Diphenylguanidine | 0.5 |

While this invention has been described with respect to a number of specific embodiments, it is obvious that there are many other modifications and variations which can be made without departing from the spirit of the invention, except as more particularly pointed out in the appended claims.

What is claimed is:

1. In the process for preparing vulcanizates having high mechanical properties by mixing a saturated amorphous copolymer of ethylene and propylene with from about 10% to about 400% by weight, based on the weight of said copolymer, of a mineral-reinforcing filler selected from the group consisting of silica, kaolin, talc, clay, calcium carbonate and alumina and with a dispersion promoter for the dispersion of said filler to thereby form a homogeneous mixture, masticating said mixture at a temperature of from about 200° C. to about 250° C., cooling, adding sulphur and an organic peroxide thereto, and vulcanizing at a temperature of from about 110° C. to about 220° C., the improvement which comprises employing as dispersion promoter from about 1% to about 20% by weight, based on the weight of said copolymer, of a macromolecular elastomer selected from the group consisting of olefin homopolymers and copolymers having grafted thereon maleic acid or maleic anhydride, nitrile rubber, ethylene-vinylacetate copolymers, butadiene-styrene-methyl vinylpridine terpolymers, and the polycondensation products of sodium polysulphide with a dihalo alkane.

2. The process of claim 1 wherein the mineral-reinforcing filler is an acidic filler.

3. The process of claim 2 wherein an alkaline compound is added to neutralize the acidity of the filler.

4. The process of claim 3 further characterized in that the alkaline compound is diphenyl guanidine.

5. The process of claim 1 wherein the promoter is added to the vulcanizable composition in an amount of about 5% by weight of the copolymer.

6. The process of claim 1 wherein the masticating is carried out in a Banbury mixer.

7. The process of claim 1 wherein the amount of peroxide added to the vulcanizable composition comprises from about 0.1 to 10 parts by weight per 100 parts by weight of the copolymer with the sulphur being added to the composition in an amount less than half of the amount of peroxide added.

8. The process of claim 1 wherein the vulcanizable composition is worked by adding all of the ingredients into a roll mixer.

9. The process of claim 1 wherein glycerine is added to the vulcanizable composition as a moistening agent.

10. The process of claim 1 wherein the amorphous-saturated copolymer is a copolymer of ethylene and propylene containing from about 20–80% by weight of ethylene and having a molecular weight ranging from about 50,000 to 500,000.

(References on following page)

TABLE 7

| Filler | Parts by Weight | Tensile Strength, kg./cm.² | Elongation at break, percent | Modulus at 300%, kg./cm.² | Permanent set, percent | Tear strength, kg./cm.² | ISO hardness | Elastic yield at 50°, percent |
|---|---|---|---|---|---|---|---|---|
| Whitetex | 100 | 45 | 450 | 40 | 10 | 24 | 60 | 54 |
| Windsor Clay | 100 | 85 | 610 | 31 | 16 | 36 | 59.5 | 46.5 |
| Socal U 1 | 100 | 65 | 700 | 15 | 12.5 | 20 | 58.5 | 43 |
| Talc | 100 | 31 | 600 | 22 | 16 | 23 | 57.5 | 56.5 |
| Hi-Sil | 50 | 116 | 575 | 35 | 14 | 35 | 76 | 53 |

References Cited

UNITED STATES PATENTS

| | | | |
|---|---|---|---|
| 2,888,424 | 5/1959 | Precopio | 260—41.5 |
| 2,958,672 | 11/1960 | Goldberg | 260—41 |
| 3,173,903 | 3/1965 | Lukach | 260—41 |
| 3,239,481 | 3/1966 | Meier | 260—41 |
| 3,278,480 | 10/1966 | Raddliff | 260—41 |
| 3,296,183 | 1/1967 | Schoenback | 260—41 |

FOREIGN PATENTS

| | | |
|---|---|---|
| 887,763 | 1/1962 | Great Britain. |

OTHER REFERENCES

Du Pont EDC–330, December 1961, pp. 3, 4, 6, 8, 9, 10, 14, and 18.

JULIUS FROME, *Primary Examiner.*

UNITED STATES PATENT OFFICE
CERTIFICATE OF CORRECTION

Patent No. 3,374,198 March 19, 1968

Luigi Falcone et al.

It is hereby certified that error appears in the above numbered patent requiring correction and that the said Letters Patent should read as corrected below.

Column 2, line 61, for "neoprene" read -- Neoprene --; column 3, line 60, for "therm-mechanical" read -- thermo-mechanica --; column 4, TABLE I, second column, line 8 thereof, for ".34" read -- 3.4 --; column 5, TABLE I, continued, fifth column, line 2 thereof, for "505" read -- 550 --; columns 7 and 8, TABLE 3 continued, fourth column, line 19 thereof, for "4" read -- 5 --; columns 9 and 10, TABLE 5, under the subheading "Yes" and opposite "Permanent set, percent" for "96" read -- 16 --; column 11, line 38, for "preparedd" read -- prepared --.

Signed and sealed this 29th day of July 1969.

(SEAL)
Attest:

EDWARD M.FLETCHER,JR.
Attesting Officer

WILLIAM E. SCHUYLER, JR.
Commissioner of Patents